(12) United States Patent
Poorman et al.

(10) Patent No.: US 7,078,627 B1
(45) Date of Patent: Jul. 18, 2006

(54) RIBBON CABLE HAVING AN OFFSET ROLLING LOOP

(75) Inventors: Paul W. Poorman, Meridian, ID (US); Josef Romako, Buchbach (AT); Hubert Schoenhart, Guntramsdorf (AT)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/044,407

(22) Filed: Jan. 27, 2005

(51) Int. Cl.
*H01B 7/08* (2006.01)
(52) U.S. Cl. .............................................. 174/117 FF
(58) Field of Classification Search ............ 174/117 F, 174/117 FF; 235/486
See application file for complete search history.

(56) References Cited

U.S. PATENT DOCUMENTS

| 4,879,433 | A | * | 11/1989 | Gillett et al. ............. 174/117 F |
| 6,612,499 | B1 | * | 9/2003 | Ellis et al. ................... 235/486 |
| 6,646,207 | B1 | * | 11/2003 | Featherstone, III ...... 174/117 F |

FOREIGN PATENT DOCUMENTS

JP          3-274608      * 12/1991

* cited by examiner

*Primary Examiner*—Chau N. Nguyen

(57) ABSTRACT

A ribbon cable is configured to include an offset rolling loop. In one embodiment, the ribbon cable includes first and second orthogonal segments forming opposed ends of the ribbon cable. A diagonal segment of ribbon cable connects the first and second orthogonal segments. The diagonal segment is configured to form the offset rolling loop to include a partial spiral turn.

17 Claims, 7 Drawing Sheets

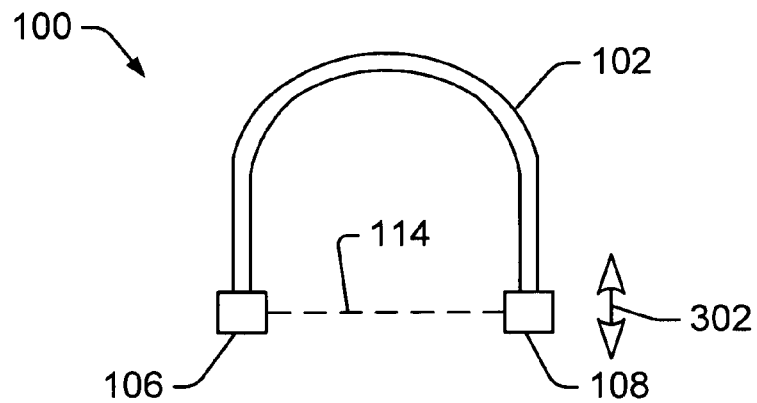
Fig. 3, Prior Art
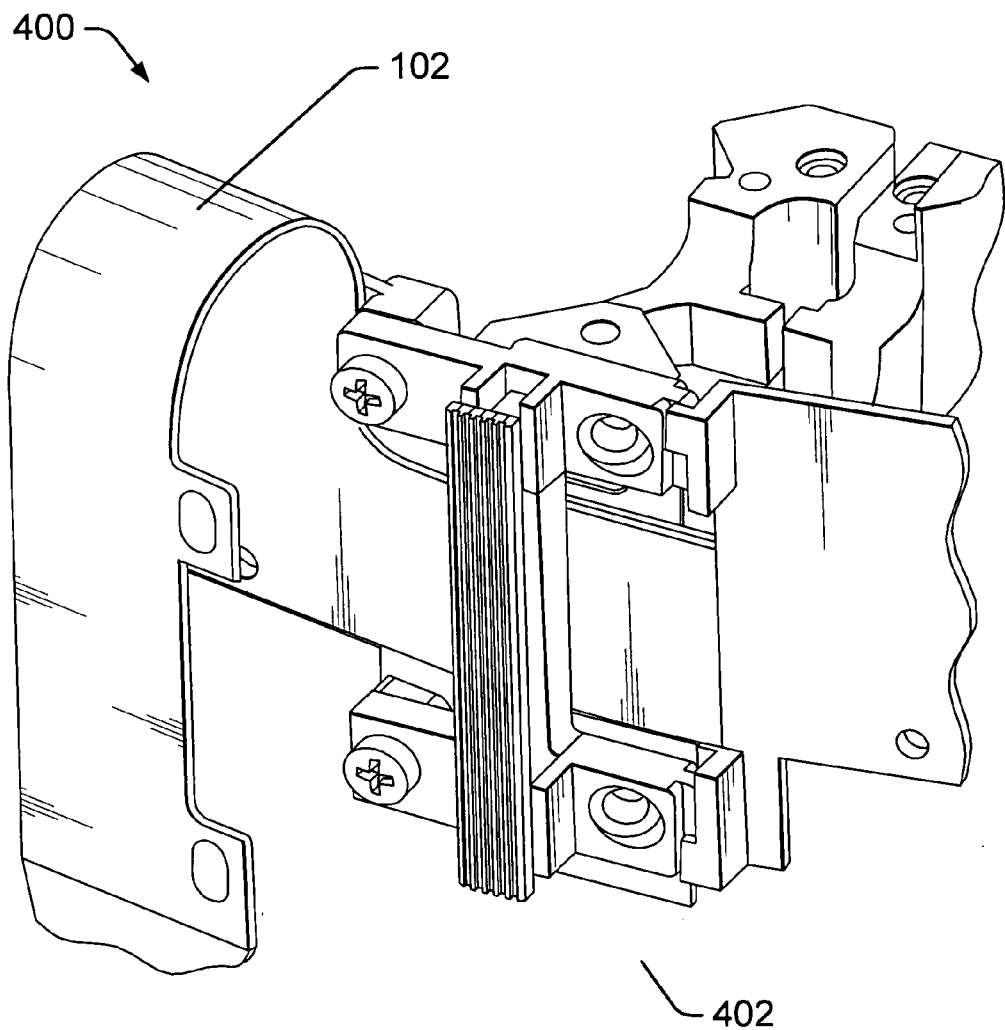
Fig. 4, Prior Art

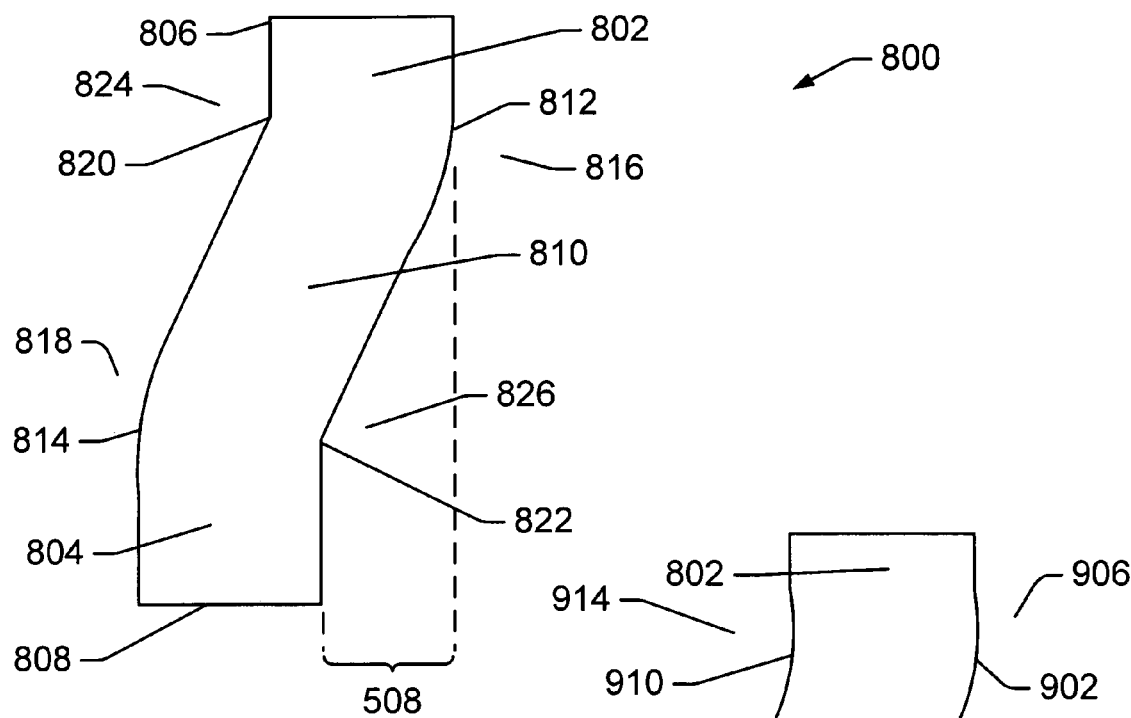
Fig. 8
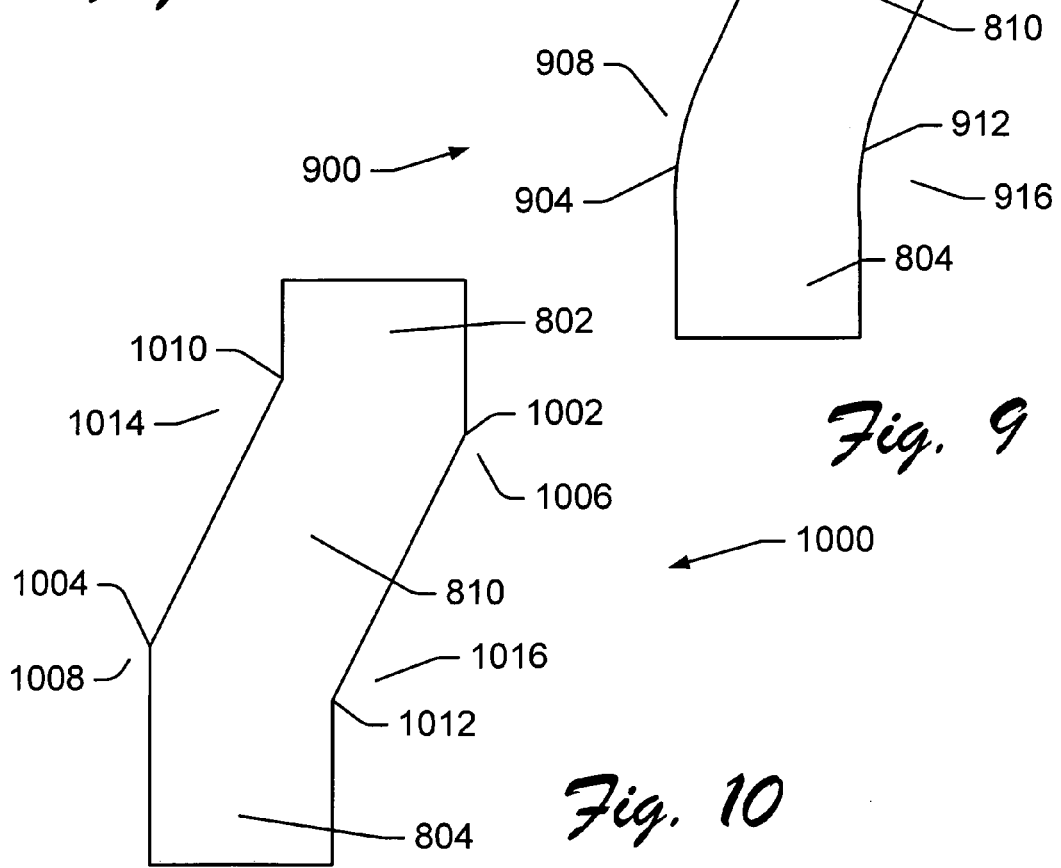
Fig. 9
Fig. 10

1300 ⟶

1302
COMMUNICATE BETWEEN A STATIONARY BASE AND A MOVEABLE HEAD THROUGH A RIBBON CABLE HAVING AN OFFSET ROLLING LOOP.

1304
APPLY FORCE TO THE MOVEABLE HEAD, WHEREIN THE FORCE APPLIED IS CALIBRATED TO INCLUDE COMPENSATION FOR A BIAS CREATED BY THE RIBBON CABLE

1306
CALIBRATE THE FORCE TO A ROLLING LOOP COMPRISING ROUNDED TURNS ON OUTSIDE CORNERS AND ANGULAR TURNS ON INSIDE CORNERS

1308
CALIBRATE THE FORCE TO A ROLLING LOOP COMPRISING ROUNDED TURNS ON OUTSIDE CORNERS AND ROUNDED TURNS ON INSIDE CORNERS

1310
CALIBRATE THE FORCE TO A ROLLING LOOP COMPRISING ANGULAR TURNS ON OUTSIDE CORNERS AND ANGULAR TURNS ON INSIDE CORNERS

1312
CALIBRATE THE FORCE TO A ROLLING LOOP, WHEREIN THE ANGLE OF THE SHAPED TURNS AND THE LENGTH OF THE DIAGONAL SEGMENT ARE SELECTED TO RESULT IN FORCES LESS THAN A DESIRED THRESHOLD

*Fig. 13*

RIBBON CABLE HAVING AN OFFSET ROLLING LOOP

TECHNICAL FIELD

The present disclosure generally relates to ribbon cables configured for attachment to one stationary and one moving device, and more particularly to a ribbon cable which is not oriented perpendicularly to the orientation of connectors at each end of the cable.

BACKGROUND

A ribbon cable having a rolling loop can be used to provide an electrical connection between two parts. Under favorable conditions, the rolling loop contributes to a goal of maintaining precise control over relative movement between the two parts, which may include fixed and stationary parts within a tape drive. A force required to match the bias against movement caused by the rolling loop is generally very low, and also importantly, the force is substantially uniform throughout a required range of motion. These characteristics promote the precise control over movement required in most applications.

FIGS. 1–3 show three orthographic views of flexible ribbon cable 100 having a rolling loop 102. The rolling loop 102 typically forms a generally half-cylindrical or parabolic configuration about an axis 104. In FIG. 1, a top plan view shows the rolling loop 102 between first and second connectors 106, 108. FIG. 2 shows a side elevation view of the cable, wherein only one connector 108 is visible. FIG. 3 shows an orthographic view according to the 3—3 arrows of FIG. 1, showing an example of the rounded shape of the rolling loop 102. An arrow 302 indicates that, during operation in some applications, the connector 108 moves (e.g. up and down) relative to the connector 106 (which, for example, may be stationary).

In operation, the head unit—connected to the mobile connector 108—moves to position the head relative to tracks on the tape media. In the example tape drive unit 400 shown in FIG. 4, the head 402 may be moved very small distances to adjust its position with respect to an individual track on the tape and may be moved a somewhat greater distances to reposition the head on a different track, or (in some applications) may be moved to retract the head from the media. Such movements cause the first and second connectors 106, 108 (as seen in FIG. 3) to move relative to each other. During this movement, a biasing force directed against the movement by the rolling loop 102 is generally (i.e. more or less) constant.

Note that FIG. 1 illustrates a common configuration wherein the connectors 106, 108 at the ends of the ribbon cable 100 are oriented in parallel directions 110, 112, and also wherein the ribbon cable path between the connectors is oriented in a direction 114 that is perpendicular to the parallel directions 110, 112. (Note that line 114 is oriented from the center of one connector 106 to the center of another connector 108.) These geometric relationships tend to result in a biasing force that is exerted by the rolling loop that is generally quite low and that is substantially constant over an intended range of movement.

FIG. 2A illustrates that an arbitrarily selected conductor (i.e. a wire) passing through the rolling loop 102 of the ribbon cable 100 makes a turn that is partially circular (or partially elliptical). For example, a segment 202 of a single conductor is shown. That segment 202 makes a partial circular or partial elliptical turn within the rolling loop 102. If the length of the segment 202 were extended in a theoretical manner, the segment would form a circle or an ellipse. For example, circle 204 is formed by the theoretical extension of segment 202. (Circle 204 is offset for purposes of illustration, thereby avoiding superimposition over segment 202.)

Unfortunately, in some ribbon cable installations, the directions 110, 112 in which the connectors are oriented may not be perpendicular to the line 114 along which the ribbon cable is oriented. This can be caused, for example, by the necessity of moving one of the connectors—e.g. moving connector 106 in the direction of 110. Movement of a connector may be in response to form-factor and other geometrical constraints which simply do not allow the connectors 106, 108 to be positioned as desired and shown in FIG. 1.

Where the relationship of lines 104, 110–114, as seen above, is not present, the rolling loop 102 of the ribbon cable may not form a generally half-cylinder or parabolic shape—as seen in FIG. 3. Unfortunately, the resulting rolling loop which is not generally half-cylindrical or parabolic in shape may present a different biasing force resisting movement of the movable component to which one end of the ribbon cable is attached. In particular, the force required to move the movable component will typically be greater than, and less constant over a range of motion than, the force in the configuration of FIG. 1.

Therefore, in some applications the geometry of the components can result in problems associated with the bias force exerted by the ribbon cable 100 on a component to which the ribbon cable is attached. A solution to this problem would result in better control over a movable component attached to one end of the ribbon cable.

SUMMARY

A ribbon cable is configured to include an offset rolling loop. In one embodiment, the ribbon cable includes first and second orthogonal segments forming opposed ends of the ribbon cable. A diagonal segment of ribbon cable connects the first and second orthogonal segments. The diagonal segment is configured to form the offset rolling loop to include a partial spiral turn.

BRIEF DESCRIPTION OF THE DRAWINGS

The following description refers to the accompanying figures. In the figures, the left-most digit(s) of a reference number identifies the figure (Fig.) in which the reference number first appears. Moreover, the same reference numbers are used throughout the drawings to reference like features and components.

FIG. 3, prior art, is an end orthographic view of the ribbon cable of FIG. 1, taken along the 3—3 lines of FIG. 1.

FIG. 4, prior art, shows an isometric view of a ribbon cable in a tape drive application.

FIG. 8 shows a first ribbon cable embodiment, wherein the ribbon cable is laid flat to better show aspects of its structure.

FIG. 9 shows a second ribbon cable embodiment, wherein the ribbon cable is laid flat to better show aspects of its structure.

FIG. 10 shows a third ribbon cable embodiment, wherein the ribbon cable is laid flat to better show aspects of its structure.

FIG. 13 shows an exemplary method utilizing a ribbon cable having an offset rolling loop according to FIGS. 5–12.

DETAILED DESCRIPTION

Figure 5:
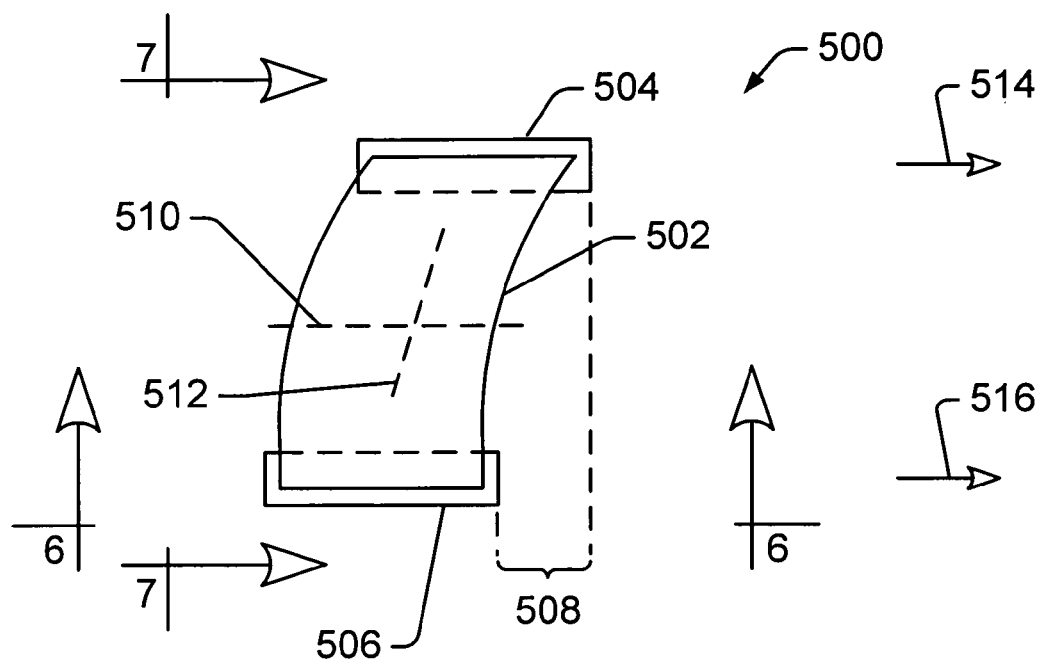
FIG. 5 is a top plan view of an exemplary ribbon cable having an offset rolling loop.

FIG. 5 is a top plan view of an embodiment of a ribbon cable 500 (as further seen in FIGS. 8, 9, 10) having an offset rolling loop 502. The ribbon cable 500 is adapted for use in a variety of applications, particularly those, such as a tape drive, printer or other electronic device, wherein the ribbon cable connects two components that move relative to each other. The rolling loop is considered to be offset because one connector, located at one end of the ribbon cable, is offset (i.e. move forward or backward) relative to the other connector, located at the other end of the cable. The offset allows the ribbon cable 500 to be installed in locations wherein a conventional ribbon cable having a conventional rolling loop would be deformed. Such a deformation would result in an increased and variable biasing resistance to movement of connected components.

The ribbon cable 500 has first and second connectors 504, 506, which may be connected to first and second components, one of which may be configured for movement relative to the other. The components are offset by a distance 508 and the rolling loop 502 is configured to be offset by the same distance.

As a result of the offset between connectors 504, 506, a line 512 between the centers of the connectors is not perpendicular to an axis 510 about which the offset rolling loop 502 makes a spiral turn (or partial spiral turn). Similarly, the line 512 is not perpendicular to the lines 514, 516, which show the orientation of the connectors 504, 506.

Figure 1:
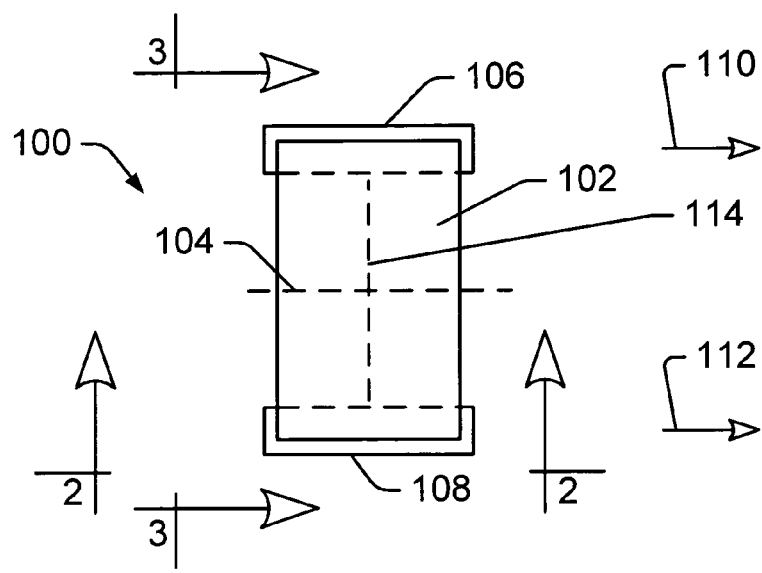
FIG. 1, prior art, is a top plan view of a conventional ribbon cable.
Figure 2:
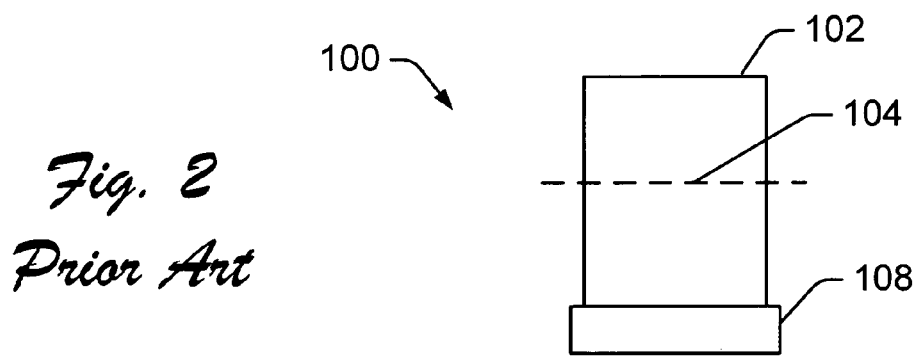
FIG. 2, prior art, is a side orthographic view of the ribbon cable of FIG. 1, taken along the 2—2 lines of FIG. 1.
Figure 2A:
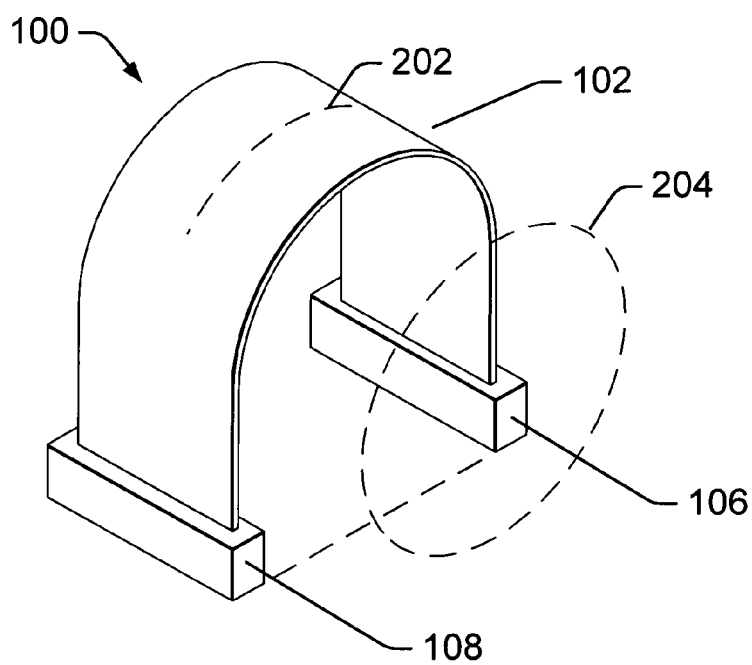
FIG. 2A, prior art, is an isometric view of the ribbon cable of FIG. 2.

In contrast, the prior art FIGS. 1–3 show the conventional structure of a flexible ribbon cable 100 having a rolling loop 102, wherein a line 114 between centers of the connectors 106, 108 is perpendicular to the axis 104 about which the rolling loop 102 makes a turn (or partial turn). In further contrast, the turn made by the rolling loop 102 about the axis 104 of the prior art does not spiral.

Figure 6:
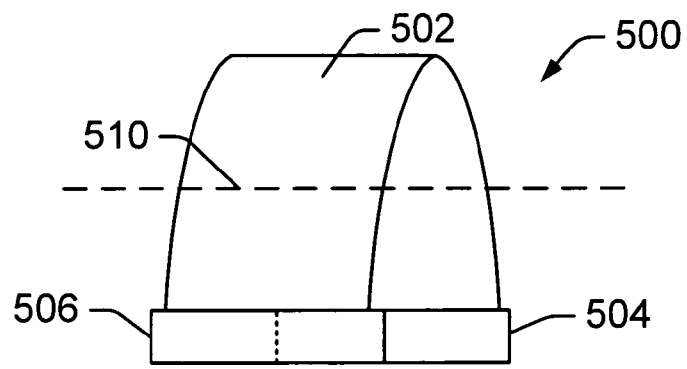
FIG. 6 is a side orthographic view of the exemplary ribbon cable of FIG. 5, taken along the 6—6 lines of FIG. 5.

FIG. 6 is a side orthographic view of the ribbon cable of FIG. 5, taken along the 6—6 lines of FIG. 5. Because of the angle of the view, the connector 506 of the ribbon cable 500 partially obscures the view of the connector 504. The rolling loop portion 502 of the ribbon cable 500 is configured to form a partially spiraling turn about the axis 510.

Figure 6A:
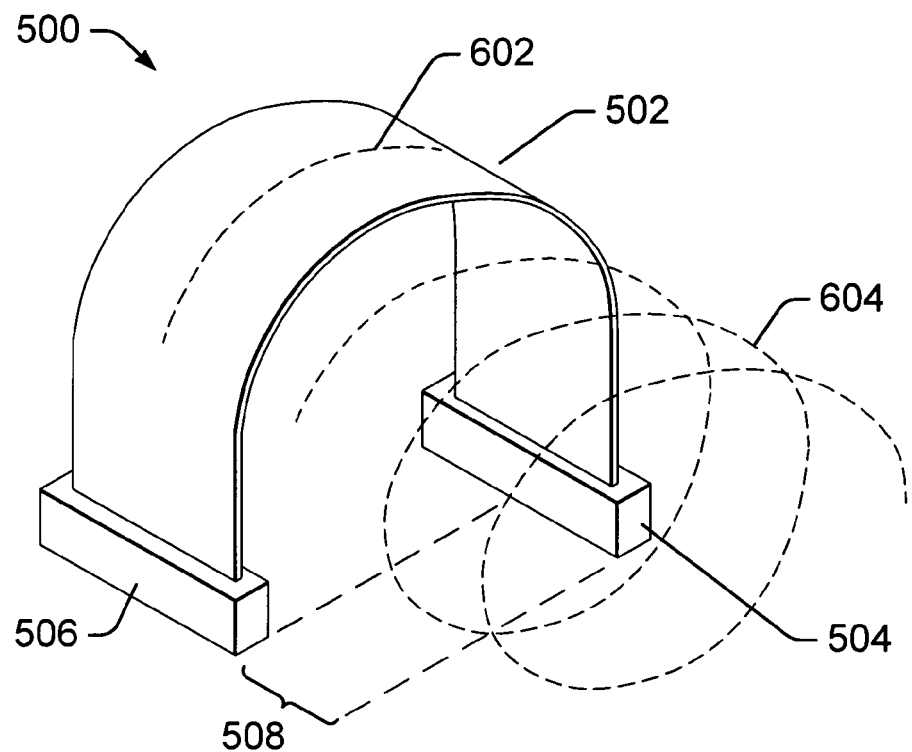
FIG. 6A is an isometric view of the exemplary ribbon cable of FIG. 6.

FIG. 6A is an isometric view of the ribbon cable 500 of FIG. 6 having an offset rolling loop 502. In particular, the connectors 504, 506 are offset by distance 508, thereby causing the rolling loop to be offset. A segment 602 of a conductor (e.g. a wire) within the offset rolling loop 502 makes a partial spiral turn about the axis 510 (seen in FIG. 5). Because of the shape of the ribbon cable (exemplary versions of which are seen in FIGS. 8–10) any conductor within the ribbon cable creates a partial spiral turn that is parallel to every other conductor within the ribbon cable. Accordingly, the entire rolling loop 502 makes a partial spiral turn about the axis 510. The partial spiral turn may be better understood by mentally extending the length of the segment 602, thereby creating a spiral 604. The spiral will be circular or elliptical in nature, and each conductor within the ribbon cable will result in a parallel spiral. Note that a 360 degree turn of the spiral results in movement of the distance 508 along the axis 510 of FIG. 5.

Figure 7:
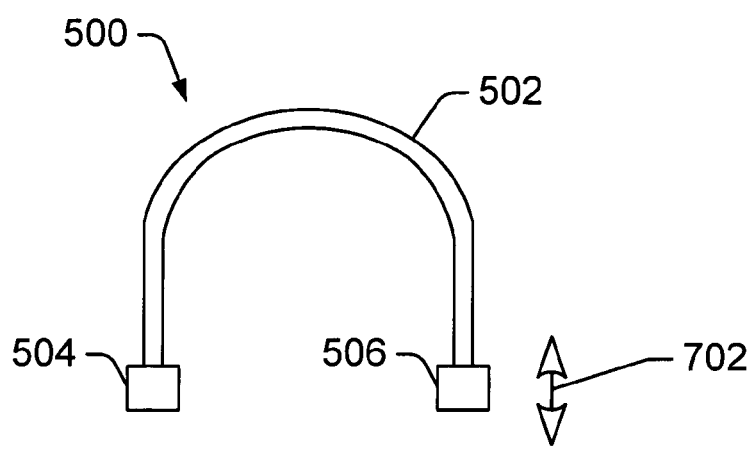
FIG. 7 is an end orthographic view of the exemplary ribbon cable of FIG. 5, taken along the 7—7 lines of FIG. 5.

FIG. 7 is an end orthographic view of the ribbon cable of FIG. 5, taken along the 7—7 lines of FIG. 5. The rounded turn of the rolling loop 502 shown. In this view, the distance 508 (FIG. 5) by which the connectors 504, 506 are offset is not apparent; similarly, the view of FIG. 7 does not show the spiraling characteristics of the rolling loop 502. An indicator 702 is representative of exemplary periodic motion that connector 506 may make, if attached to the head of a tape drive, for example.

FIG. 8 shows a first ribbon cable embodiment 800, wherein the ribbon cable is laid flat to better show aspects of its structure. The ribbon cable 800 includes first and second orthogonal segments 802, 804 at opposed ends 806, 808 of the ribbon cable. The orthogonal segments are separated by a diagonal segment 810, having a slope oriented non-orthogonally with respect to the orthogonal segments 802, 804. Thus, the diagonal segment has a diagonal travel that is sufficient to compensate for the offset 508 (first seen in FIG. 5) by which one end 806 of the ribbon cable 800 is offset from the other end 808 of the ribbon cable. Note that the offset may be determined by the need to move one of the connectors 504, 506 (FIG. 5 or 7) relative to the other due to size and shape of other components used in the application.

The orthogonal segments 802, 804 are connected to the diagonal segment 810 by shaped turns (typically either rounded or angular). In the example of FIG. 8, rounded turns 812, 814 are present on outside corners 816, 818 between the diagonal segment 810 and the orthogonal segments 802, 804. Additionally, angular turns 820, 822 are present on inside corners 824, 826 between the diagonal segment 810 and the orthogonal segments 802, 804.

FIG. 9 shows a second ribbon cable embodiment 900, wherein the ribbon cable is laid flat to better show aspects of its structure. The ribbon cable 900 includes first and second orthogonal segments 802, 804 at opposed ends of the ribbon cable. The orthogonal segments are separated by a diagonal segment 810, which includes a non-orthogonal slope sufficient to compensate for an offset by which one end of the ribbon cable is offset from the other end of the ribbon cable. In the example of FIG. 9, rounded turns 902, 904 are present on outside corners 906, 908 between the diagonal segment 810 and the orthogonal segments 802, 804. Additionally, rounded turns 910, 912 are present on inside corners 914, 916 between the diagonal segment and the orthogonal segments.

FIG. 10 shows a third ribbon cable embodiment 1000, wherein the ribbon cable is laid flat to better show aspects of its structure. The ribbon cable 1000 includes first and second orthogonal segments 802, 804 at opposed ends of the ribbon cable. The orthogonal segments are separated by a diagonal segment 810, which includes a non-orthogonal slope sufficient to compensate for an offset by which one end of the ribbon cable is offset from the other end of the ribbon cable. In the example of FIG. 10, angular turns 1002, 1004 are present on outside corners 1006, 1008 between the diagonal segment 810 and the orthogonal segments 802, 804. Additionally, angular turns 1010, 1012 are present on inside corners 1014, 1016 between the diagonal segment and the orthogonal segments.

The shape of the shaped turns 812, 814, 820, 822, 902, 904, 910, 912, 1002, 1004, 1010, 1012 influences the magnitude, and uniformity (or lack of uniformity) during a range of movement, of the bias against movement 702 (see FIG. 7) of the connector 506. Accordingly, the ribbon cables of FIGS. 8–10, and other variations on these ribbon cables, will result in different bias forces which resist the movement of the moving object to which the ribbon cable is connected. Therefore, upon testing or calculation, one of these cables may give better performance in a particular application. In particular, the shape of the turns, e.g. rounded, angular or a mixture thereof, can be selected to most nearly achieve any desired result, in terms of the magnitude of the bias presented by the offset rolling loop, as well as the uniformity of that bias over a range of movement. Accordingly, selection of one of the ribbon cables of FIGS. 8–10 may give better performance in a given application.

Additionally, the angle of the turns influences the length of the diagonal segment 810, a factor which can influence the magnitude and uniformity of the bias present in the offset rolling loop 502 (FIG. 5) that resists movement of the moveable connector (e.g. 506 of FIG. 5). Therefore, the angle of the shaped turns may be selected to vary the length of the diagonal segment, and to thereby vary the magnitude and uniformity of the bias of the offset rolling loop.

Figure 11:
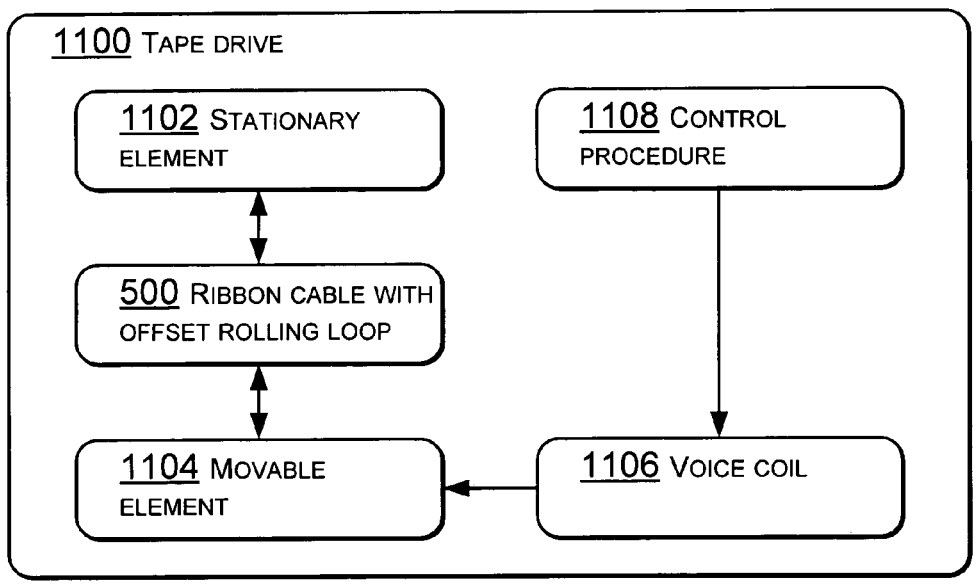
FIG. 11 shows a block diagram of an exemplary tape drive including a ribbon cable having an offset rolling loop according to one or more of FIGS. 5–10.

FIG. 11 shows a block diagram of an example of a tape drive 1100 including a ribbon cable having an offset rolling loop according to one or more of FIGS. 5–10. The tape drive 1100 includes a stationary element or base 1102 and a moveable element 1104, such as a tape head. A ribbon cable (e.g. ribbon cable 500, 800, 900 or 1000) with offset rolling loop 502 (not shown in FIG. 11) connects the stationary base 1102 to the moveable head 1104. The moveable element 1104 is moved by a device, such as a voice coil 1106 or similar device configured for very precise movement. The voice coil 1106 is operated and/or driven by a control procedure 1108.

The control procedure 1108 is configured to send a calibrated control signal 1110 to the voice coil 1106 and to thereby induce movement in the movable head 1104. The signal 1110 is calibrated to result in desired movement of the head 1104. One aspect of the calibration is to recognize bias magnitude and/or uniformity of the ribbon cable with offset rolling loop which resists head movement. Such bias results in part from the shape of turns providing transition between the first and second orthogonal segments 802, 804 and the diagonal segment 810 of the ribbon cable. For example, a preferred ribbon cable 800, 900 or 1000 may be selected, depending one the application. The control procedure 1108 may then be calibrated according to the biasing characteristics of the ribbon cable selected.

Figure 12:
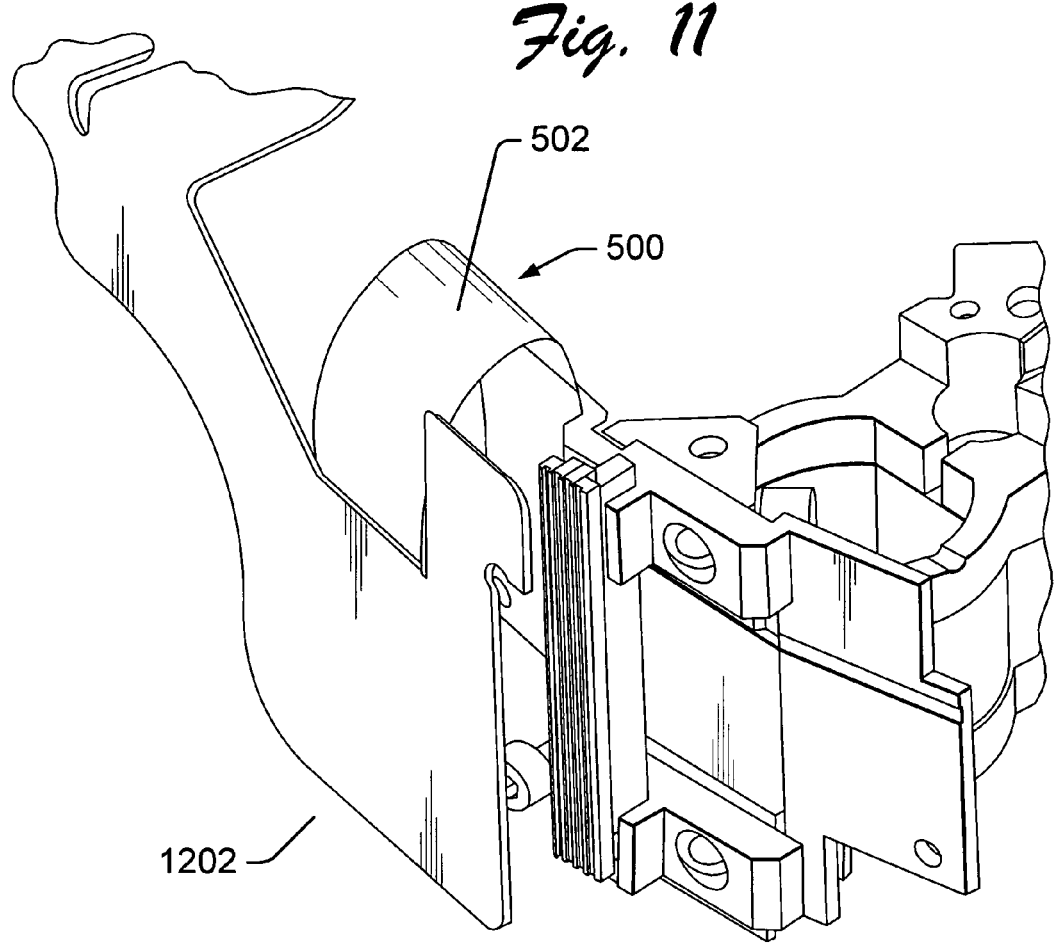
FIG. 12 shows an isometric view of an exemplary tape drive including a ribbon cable having an offset rolling loop according to one or more of FIGS. 5–10.

FIG. 12 shows an isometric view of an example of a tape drive 1200 including a ribbon cable 500 having an offset rolling loop 502 according to one or more of FIGS. 5–10. In this example application, the stationary base 1202 is fixed relative to the head unit 1204, which is configured for precise movement relative to magnetic tape or other media. While a tape drive 1200 is shown as an exemplary implementation, some printers, disk drives and other devices can utilize ribbon cable 500 or variations thereof.

The flow chart of FIG. 13 illustrates a further exemplary implementation, wherein a method 1300 is employed to operate an apparatus having a stationary component and a moveable component, such as tape drive 1200. The elements of the method may be performed by any desired means, such as by the execution of processor-readable instructions defined on a processor-readable media, such as a disk, a ROM or other memory device or by operation of an application specific integrated circuit (ASIC) or other hardware device. In one implementation, the ROM may contain software or firmware implementing the control procedure module 1108 of FIG. 11. In an alternative implementation, an ASIC may contain logic which implements the control module 1108 according to an exemplary method as seen in the flow chart of FIG. 13. Also, actions described in any block may be performed in parallel with actions described in other blocks, may occur in an alternate order, or may be distributed in a manner which associates actions with more than one other block.

At block 1302, a stationary component (e.g. tape drive base 1102 of FIG. 11 or 12) communicates with a moveable component (e.g. tape head 1104 of FIG. 11 or 12) through a ribbon cable having an offset rolling loop. In one implementation, the ribbon cable having an offset rolling loop includes first and second orthogonal segments 802, 804 connected by a diagonal segment 810 configured as a rolling loop 502.

At block 1304, force is applied to the moveable head. The force is calibrated to include compensation for a bias created by the ribbon cable. Compensation may be made for the bias in a number of ways, several of which are listed here, and others of which are seen within other locations of this specification or may be easily understood and recognized as a result of exposure to the teachings herein. In a first alternative, at block 1306, the force is calibrated to be appropriate for use with a rolling loop 800 comprising rounded turns 812, 814 on outside corners 816, 818 between the diagonal segment 810 and the orthogonal segments 802, 804 and angular turns 820, 822 on inside corners 824, 826 between the diagonal segment and the orthogonal segments. (See, for example, FIG. 8.)

In a second alternative, at block 1308, the force is calibrated to be appropriate for use with a rolling loop 900 comprising rounded turns 902, 904 on outside corners 906, 908 between the diagonal segment 810 and orthogonal segments 802, 804 and rounded turns 910, 912 on inside corners 914, 916 between the diagonal segment and orthogonal segments. (See, for example, FIG. 9.)

In an third alternative, at block 1310, the force is calibrated to be appropriate for use with a rolling loop 1000 comprising angular turns 1002, 1004 on outside corners 1006, 1008 between the diagonal segment 810 and orthogonal segments 802, 804 and angular turns 1010, 1012 on inside corners 1006, 1008 between the diagonal segment and orthogonal segments. (See, for example, FIG. 10).

In a fourth alternative, at block 1312, the force is calibrated to be appropriate for use with a rolling loop 1000 wherein angles of the shaped turns and the length of the diagonal segment have been selected to result in an acceptably low (i.e. below a threshold) biasing force exerted by the offset rolling loop that is acceptably consistent (i.e. varies less than a threshold) over a required range of motion.

Although the above disclosure has been described in language specific to structural features and/or methodological steps, it is to be understood that the appended claims are not limited to the specific features or steps described. Rather, the specific features and steps are exemplary forms by which this disclosure may be implemented. For example, while the above-described embodiments are adapted for data transmission in a tape-drive application, similar embodiments could be adapted for use in printers, disk drives or other devices. Similarly, while the above-described embodiments are adapted for data transmission, power transmission could additionally, or alternatively, be performed. And further, while actions described in blocks of the flow diagrams may be performed in parallel with actions described in other blocks, the actions may occur in an alternate order, or may be distributed in a manner which associates actions with more than one other block. And further, while elements of the methods disclosed are intended to be performed in any desired manner, it is anticipated that computer- and/or processor-readable instructions, performed by a computer and/or processor, typically located within a device such as tape drive 1100/1200, reading from a computer- or processor-readable media, such as a ROM, disk or CD ROM, would be preferred, but that an application specific gate array (ASIC) or similar hardware structure, could be substituted.

The invention claimed is:

1. A tape drive, comprising:
a stationary base;
a moveable head;
a ribbon cable, connecting the stationary base to the moveable head, wherein the ribbon cable comprises:
first and second orthogonal segments at opposed ends of the ribbon cable, wherein one orthogonal segment is attached to the stationary base and one orthogonal segment is attached to the moveable head; and
a diagonal segment connecting the first and second orthogonal segments, wherein diagonal travel of the diagonal segment compensates for an offset by which the first orthogonal segment is offset from the second orthogonal segment, and wherein the diagonal segment forms a offset rolling loop comprising a partial spiral turn;
a voice coil configured to move the moveable head; and
a control procedure configured to send a calibrated control signal to the voice coil and to thereby induce movement in the movable head wherein the calibration adjusts the control signal according to a shape of turns providing transition between the first and second orthogonal segments and the diagonal segment.

2. The tape drive of claim 1, wherein the ribbon cable additionally comprises:
first and second connectors, attached to the first and second orthogonal segments, respectively; and
wherein the second connector is offset with respect to the first connector.

3. The tape drive of claim 2, wherein the ribbon cable is not oriented in a direction that is perpendicular to a direction in which the connectors are oriented.

4. The tape drive of claim 1, wherein the ribbon cable additionally comprises:
angular turns on outside corners between the diagonal segment and the orthogonal segments; and
angular turns on inside corners between the diagonal segment and the orthogonal segments.

5. The tape drive of claim 1, additionally comprising:
first and second connectors, attached to the first and second orthogonal segments, respectively; and
wherein the first and second connectors are offset by an amount similar to diagonal travel of the diagonal segment.

6. The tape drive of claim 1, wherein each conductor within the ribbon cable makes the partial spiral turn parallel to other conductors within the ribbon cable.

7. The tape drive of claim 1, additionally comprising:
rounded turns on outside corners between the diagonal segment and the orthogonal segments; and
angular turns on inside corners between the diagonal segment and the orthogonal segments.

8. The tape drive of claim 1, additionally comprising:
rounded turns on outside corners between the diagonal segment and the orthogonal segments; and
rounded turns on inside corners between the diagonal segment and the orthogonal segments.

9. A method of operating a tape drive, comprising:
communicating between a stationary base and a moveable head through a ribbon cable comprising first and second orthogonal segments, wherein the segments are separated by an offset distance, and are connected by a diagonal segment configured as an offset rolling loop, wherein diagonal travel of the diagonal segment compensates for the offset distance by which the first orthogonal segment is offset from the second orthogonal segment;
applying force to the moveable head, wherein the force is calibrated to include compensation for a bias created by the ribbon cable; and
wherein the bias of the ribbon cable results in part from shaped turns that provide transition between the first and second orthogonal segments and the diagonal segment.

10. The method of claim 9, wherein the applying force to the moveable head comprises:
applying a force calibrated to a rolling loop comprising rounded turns on outside corners between the diagonal segment and the orthogonal segments and angular turns on inside corners between the diagonal segment and the orthogonal segments.

11. The method of claim 9, wherein the applying force to the moveable head comprises:
applying a force calibrated to a rolling loop comprising rounded turns on outside corners between the diagonal segment and orthogonal segments and rounded turns on inside corners between the diagonal segment and orthogonal segments.

12. The method of claim 9, wherein the applying force to the moveable head comprises:
applying a force calibrated to a rolling loop comprising angular turns on outside corners between the diagonal segment and orthogonal segments and angular turns on inside corners between the diagonal segment and orthogonal segments.

13. The method of claim 9, wherein applying force to the moveable head comprises:
applying a force calibrated to a rolling loop comprising a diagonal segment of a length selected to result in a biasing force less than a desired threshold value.

14. An apparatus having a stationary component and a moveable component, the apparatus comprising:
means for communicating between the stationary component and the moveable component comprising a ribbon cable having first and second orthogonal segments separated by a diagonal segment configured as an offset rolling loop, and first and second connectors, attached to the first and second orthogonal segments, respectively, wherein the first and second connectors are parallel in orientation, and the second connector has an offset with respect to the first connector;

means for applying force to the moveable head, wherein the force is calibrated to include compensation for a bias created by the ribbon cable; and wherein the bias of the ribbon cable results in part from shaped turns that provide transition between the first and second orthogonal segments and the diagonal segment, and wherein diagonal travel of the diagonal segment compensates for the offset by which the first orthogonal segment is offset from the second orthogonal segment.

15. The apparatus of claim 14, wherein the means for applying force to the moveable head comprises:

means for applying a force calibrated to a rolling loop comprising rounded turns on outside corners between the diagonal segment and orthogonal segments and angular turns on inside corners between the diagonal segment and orthogonal segments.

16. The apparatus of claim 14, wherein the means for applying force to the moveable head comprises:

means for applying a force calibrated to a rolling loop comprising rounded turns on outside corners between the diagonal segment and orthogonal segments and rounded turns on inside corners between the diagonal segment and orthogonal segments.

17. The apparatus of claim 14, wherein the means for applying force to the moveable head comprises:

means for applying a force calibrated to a rolling loop comprising angular turns on outside corners between the diagonal segment and orthogonal segments and angular turns on inside corners between the diagonal segment and the orthogonal segments.

* * * * *

UNITED STATES PATENT AND TRADEMARK OFFICE
CERTIFICATE OF CORRECTION

| | | |
|---|---|---|
| PATENT NO. | : 7,078,627 B1 | Page 1 of 1 |
| APPLICATION NO. | : 11/044407 | |
| DATED | : July 18, 2006 | |
| INVENTOR(S) | : Paul W. Poorman et al. | |

It is certified that error appears in the above-identified patent and that said Letters Patent is hereby corrected as shown below:

In column 7, line 45, in Claim 1, after "head" insert -- , --.

Signed and Sealed this

Sixteenth Day of November, 2010

David J. Kappos
*Director of the United States Patent and Trademark Office*